May 2, 1950     J. A. VAN DEN AKKER     2,506,048
CREEP TESTING APPARATUS

Filed Oct. 23, 1946     2 Sheets-Sheet 1

INVENTOR.
Johannes A. Van Den Akker
BY
Soans, Pond & Anderson
Attys

May 2, 1950 — J. A. VAN DEN AKKER — 2,506,048
CREEP TESTING APPARATUS
Filed Oct. 23, 1946 — 2 Sheets-Sheet 2

INVENTOR.
Johannes A. Van Den Akker
BY
Soans, Pond & Anderson
Attys.

Patented May 2, 1950

2,506,048

UNITED STATES PATENT OFFICE 2,506,048

CREEP TESTING APPARATUS

Johannes A. Van den Akker, Appleton, Wis., assignor to The Institute of Paper Chemistry, Appleton, Wis., a corporation of Wisconsin Application October 23, 1946, Serial No. 705,105

4 Claims. (Cl. 73—100)

The present invention relates to apparatus for measuring deflection and, in particular, to apparatus for measuring permanent deformation or the creep of materials resulting from prolonged stress.

In the testing of certain materials, such as plastic and paperboard products, one of the most important criteria of usefulness is the amount of cold flow under stress, commonly called creep. In the common forms of creep testing the specimen is subjected to a tensional or flexural load over a prolonged period of time. At various times during the period of loading the deflection of the material is measured and subsequently plotted against time to serve as a measure of the endurance of the material.

Heretofore, most deflection measurements of the type described have been made with dial micrometers. The known methods of utilizing dial micrometers for this purpose, inherently result in the production of a thrust which must be added to, or subtracted from, the constant, dead-weight, load applied to the specimen. Moreover, the thrust of the micrometer is not constant for all deflections, but varies with the deflection indicated; increasing as the spindle of the micrometer is retracted into the instrument. The varying thrust characteristics of the dial micrometer thus cause the load to become a function of deflection, and thereby introduce errors in the observed readings. Some of the inaccuracies in measurement contributed by the characteristics of the micrometer can be eliminated by the application of the micrometer to the specimen during the entire test period, but the prolonged periods involved in creep testing require that a large number of specimens be tested simultaneously, and so the high cost of dial micrometers practically prohibits their use as a constant measuring device in the described tests.

Accordingly, the principal object of the present invention is to provide improved deflection measuring apparatus having sufficient inherent accuracy for the measurement of deformation or creep due to prolonged stress. A further object of the invention is to provide low cost measuring apparatus of this general type which exerts a constant thrust on the specimen throughout the test period. Further objects and advantages will be apparent by reference to the following description and the accompanying drawings.

Figure 1:
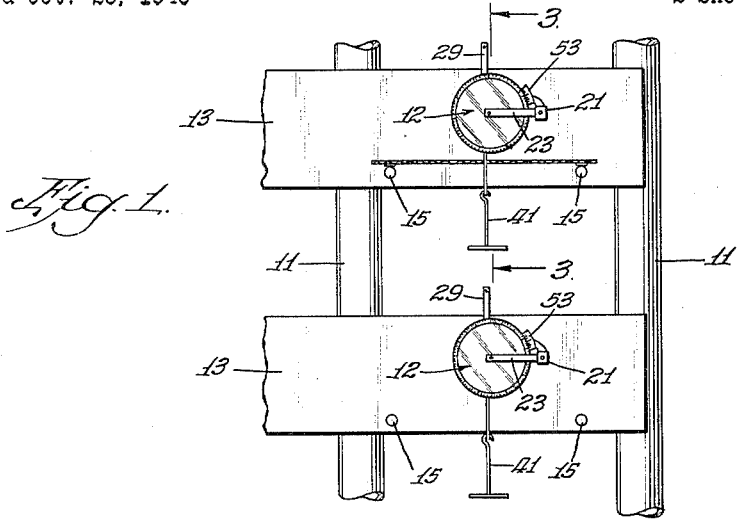
Fig. 1 is a fragmentary elevational view of a plurality of test devices in accordance with the invention assembled into a testing bank for measuring creep.

In general, the apparatus comprises a frame for supporting the specimen and the various parts of the testing device, suitable means for applying a load to the specimen, a measuring device including a sensing means, an indicating dial suitably divided to indicate the deflection of the specimen, and means for transmitting movements of the sensing means to the indicating dial.

The supporting frame of the particular test equipment illustrated comprises vertical supporting stands 11, which may be constructed from a convenient structural shape such as steel pipe, and mounting plates 13, which extend horizontally from the supporting stands 11 to provide mounting surfaces for a plurality of testing devices 12. The base of the frame may be permanently attached to the floor or may be mounted on rollers for convenient movement of the apparatus. Testing a plurality of samples may be facilitated by mounting a series of testing devices upon a portable frame which may be moved about the laboratory as desired.

In the test illustrated the specimen is being subjected to stress as a simple beam, and each specimen is supported upon spaced support pins 15 which extend outwardly from the mounting plate 13 on each side of the associated testing device. The other elements of each of the testing devices 12 is likewise supported on one of the plates 13. Each of the testing devices 12 comprises deflection measuring means which include two horizontal, outwardly extending support or guide members 17 and 19, each of which is provided with a slot as indicated at 43 and 45, to guide a sensing bar 29. There is also an outwardly extending support 21 which has attached thereto a vernier indicating scale 53 and a horizontal, longitudinally extending bar 23 provided with a pin bearing 25 for supporting one end of the indicator dial shaft 27.

The sensing bar 29 is preferably a rod of metal with a square cross-section, about 5 inches in length, to which at the lower end thereof is integrally attached a short cylindrical section 30 (about 1½ inches long). The lower end of the cylindrical portion 30 of the sensing bar 29 is formed into a point 31, the point engaging a weight distributing bar 39 which is supported by the specimen 37 intermediate the support pins 15 (Fig. 2), as hereinafter described. To the cylindrical section 30 there is integrally attached, in a plane normal to that of the mounting plate 13, an outwardly extending, hollow, tubular section 33, the lower portion thereof providing a curved bearing surface for a weight yoke 35. The yoke 35 is adapted to support a suitable weight carrying member, for example the weight pan 41, which, when loaded, causes the sensing bar 29 and associated weight distributing bar 39 to apply a load to the specimen 37.

Figure 3:
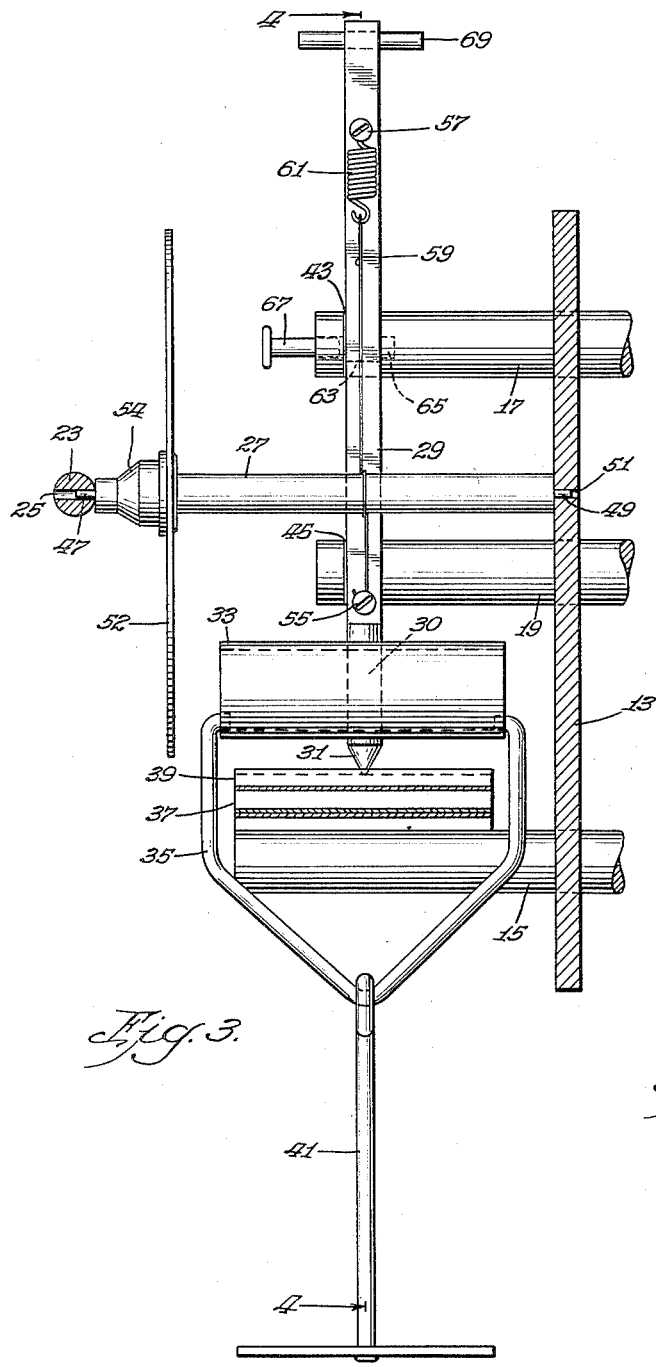
Fig. 3 is an enlarged sectional view on line 3—3 in Fig. 1.

The indicator dial shaft bearing pin 47 and 49 are journalled into suitable bearings 25 and 51 provided in the support 23 and the mounting plate 13 respectively (Fig. 3). At the outer end of the shaft 27 there is integrally attached a suitable indicating dial or card 52 designed so as to co-operate with the vernier scale 53 to measure rotation of the indicator shaft 27. A hub 54 is provided to prevent end play in the shaft 27. The shaft 27 and the indicating card 52 should be fabricated from materials which will insure a small moment of inertia in the rotating parts.

In order to translate vertical movement of the sensing bar 29 to rotational movement of the indicator dial shaft 27, the sensing bar 29 is provided with two tapped holes and screws 55 and 57 to anchor an aligning and indicator actuating wire 59. The wire 59 is preferably of a small diameter (about .005 inch), and extends from the lower anchor screw 55, around the indicator shaft 27, to the tensioning spring 61 attached to the upper anchor screw 57, the spring holding the wire taut about the shaft 27. The tension on the wire 59 also tends to keep the sensing bar aligned in the slots 43 and 45 provided in the supporting members 17 and 19. The use of a spring as a tensioning means provides for even bearing loadings as the vertical forces exerted on the bearings will be substantially equal. Substantial tension may be employed in the wire 59 without adding to the load on the bearings. This greatly reduces the frictional torque on the bearings, which is due only to the weight of the shaft 27 and the dial 52.

Figure 2:
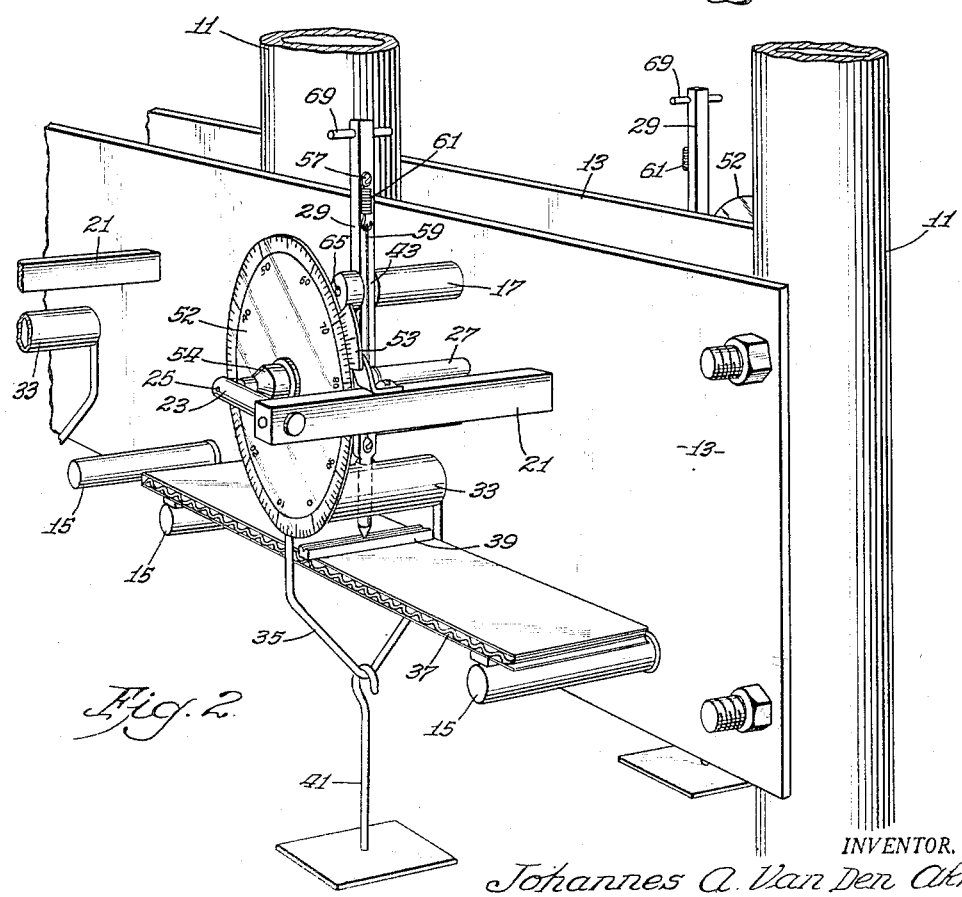
Fig. 2 is an enlarged isometric view of one of the testing devices illustrated in Fig. 1.
Figure 4:
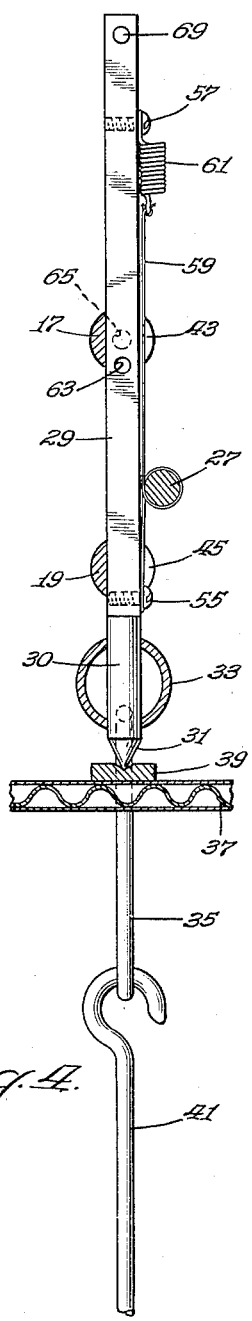
Fig. 4 is a similar view on line 4—4 in Fig. 3.

During operation of the apparatus, the specimen 37 is supported for test upon the supports 15 as is shown in Fig. 2 and the weight distributing block 39 is placed in position under the point 31 of sensing bar 29. The ends of the weight yoke 35 are placed in the hollow ends of the cylindrical section 33 and the weight pan 41 is suspended from the lower portion of said yoke. The sensing bar 29 rides freely in the slots 43 and 45 provided in the sensing bar supports 17 and 19 respectively, and is guided by the taut indicating wire 59 and the indicator shaft 27 which is arranged in staggered relation with the supports 17 and 19 as particularly illustrated in Fig. 4. The indicating card 52 may be turned slowly to the zero position and the weight pan 41 loaded with the desired weights. As the specimen flexes under strain, the sensing bar and weights move downwardly causing the taut wire 59 to rotate the indicator shaft 27 with its attached indicator card. Readings may be taken as required during the period of the test by reference to the dial 52 and the vernier 53.

Upon completion of the crepe test the sensing bar 29 may be raised to a position such that a hole 63 formed in the upper portion of the sensing bar coincides with a hole 65 provided in the support member 17 whereupon a supporting pin 67 may be inserted to lock the members in position. The test specimen may then be removed and another specimen readied for test. Cross rod 69 is provided to facilitate lifting the sensing rod 29 and adjusting the apparatus, and to prevent the sensing system and weights from falling upon and damaging the test below when a specimen fails completely.

The relation between the diameters of the transmitting wire 59, the indicator shaft 27, and the indicator dial 52 are not critical. However, as the diameter of the indicator shaft 27 is reduced the angular rotation of the indicator dial 52 is increased as compared to the linear travel of the sensing bar. For ease of calibration the shaft and wire diameter should be such that the movement of the sensing bar is magnified to proportions that may be readily and accurately calibrated on the indicator dial. It has been found that a convenient sized indicator shaft 27 for relatively flexible material, such as corrugated paperboard, should have a diameter including the turn of wire 59 of 0.3183 inch. The circumference of the rod and wire will then be one inch and the indicator disc when graduated into 100 divisions over 360 degrees will provide deflection readings of the specimen 37 directly in increments of .01 inch. A vernier provided with 20 divisions equivalent in length to 19 divisions on the disc will decrease the readable increments to .0005 inch.

It is apparent that the testing device as described may be used for creep tests other than deflection under load as a simple beam. The test specimen may be rigidly attached, in a vertical position, to the frame at a point higher than the test apparatus. The cross rod 69 may then be attached, by means of a suitable clamp arrangement, to the lower portion of the specimen, the supporting pin 67 may be removed, and the weight pan 41 may be loaded to test the cold flow of the specimen under longitudinal stress. In a similar manner the specimen may be supported as a cantilever and tested for shear, or the sensing and loading means may be attached to the specimen through a suitable lever arm to indicate resistance to torsion.

My invention provides an inexpensive apparatus for accurately measuring the amount of creep of a test specimen. The weight of the measurement apparatus and load are constantly applied to the test specimen thereby eliminating annoying dead weight corrections and inaccuracies inherent with prior art devices. One of the important features of the invention is the spring tension applied to the connecting wire 29. The use of the spring eliminates balance weights which tend to oscillate whenever the test rack is moved and also provides for the application of a balanced force to the indicator shaft bearings insuring long life and increased accuracy.

The creep measuring apparatus may be constructed from any suitable materials, but it is advisable to use non-corrodible materials to permit use of the instrument in atmospheres of high humidity. If the apparatus is to be located near electrical or magnetic installations it is desirable that the materials used in the moving parts be non-magnetic if uniform accuracy is required.

The features of my invention that are believed to be new are expressly set forth in the appended claims.

I claim:

1. In testing apparatus of the class described, means for supporting the apparatus including means for supporting a test specimen, means for loading the specimen, and means for measuring the deflection of said specimen, said measuring means including a sensing bar adapted to contact the specimen under test, a pair of guide members arranged to contact one side of said sensing bar at vertically spaced intervals therealong, a rotatably mounted indicator shaft to which an indicator disc is integrally attached, said indicator shaft being positioned adjacent said sensing bar intermediate said guide members and on the side of said sensing bar which is opposite that contacted by said guide members, said guide members and said indicator shaft cooperating to guide said sensing bar and means for transmitting the motion of the sensing bar to said indicator shaft including a flexible wire extending from a position adjacent the lower end of said sensing bar around said indicator shaft to a point adjacent the upper end of said sensing bar whereby movement of said sensing bar and said wire will rotate said indicator shaft, and means for mechanically connecting said loading means and said sensing bar so as to exert a constant force upon the test specimen.

2. In testing apparatus of the class described a frame including vertical supporting members, horizontal mounting members, specimen supporting members extending outwardly from said mounting members, and vertically spaced, slotted guide members extending outwardly from said mounting members, a loading yoke whereby various loads are applied to test specimen, deflection measuring means including a sensing bar adapted to contact the specimen under test, said sensing bar being positioned in a plane parallel to the plane of the mounting members and being supported in the slots of said slotted guide members so as to move freely therein, a rotatably mounted indicator shaft to which an indicator disc is integrally attached for measuring rotation of said indicator shaft, and means for mechanically connecting said sensing bar to said indicator shaft including a flexible wire extending from a position adjacent the lower end of said sensing bar around said indicator shaft to a point adjacent the upper end of said sensing bar, said wire including a resilient tensioning means whereby vertical movement of said wire and said sensing bar will rotate said indicator shaft, and bearing means on said sensing bar whereby said loading yoke may be mechanically connected to said sensing bar so as to exert a constant force upon the test specimen.

3. In testing apparatus of the class described, a frame including vertical supporting members and a horizontally extending mounting member connecting said vertical supporting members, specimen supporting members and a pair of vertically spaced-apart guide members extending outwardly from said mounting members, each of said guide members having a vertically extending slot therein and the slots in said guide members being vertically aligned, a loading yoke whereby various loads are applied to a test specimen, deflection measuring means including a sensing bar adapted to contact the specimen under test, said sensing bar being supported in the slots of said slotted guide members so as to move freely, a rotatably mounted indicator shaft to which an indicator disk is integrally attached for measuring the rotation thereof, said indicator shaft extending outwardly from said mounting member and being disposed at right angles to said sensing bar, said indicator shaft being positioned closely adjacent said sensing bar to coact with said slotted guide members in guiding said sensing bar, and means for mechanically connecting said sensing bar to said indicator shaft including a flexible wire extending from a position adjacent the lower end of said sensing bar around said indicator shaft to a point adjacent the free end of said sensing bar, said wire being rigidly attached to said sensing bar at the upper and lower ends thereof and said wire including a resilient tensioning means whereby vertical movement of said wire and said sensing bar will rotate said indicator shaft, and sample loading means including a tubular member which is attached to the lower end of said sensing bar, said loading yoke being mechanically connected in the ends of said tubular member so as to extend around the specimen under test, thereby to exert a balanced force upon the test specimen through said sensing bar.

4. In testing apparatus of the class described, a frame including vertically disposed supports and a horizontally extending mounting member, specimen supporting members extending outwardly from said mounting member, a loading yoke whereby various loads are applied to a specimen under test, deflection measuring means including a vertically disposed sensing bar adapted to engage a specimen under test, a pair of support members for said sensing bar which extend outwardly from said mounting member, an indicator shaft rotatably supported upon said frame and extending outwardly from said mounting member in a direction substantially normal to the axis of said sensing bar, said indicator shaft and said sensing bar support members serving as three guides for said sensing bar and being arranged in a staggered relation with two of said three guides disposed on one side of said sensing bar and the other of said three guides being disposed on the other side of said sensing bar intermediate the two guides thereby positioning said sensing bar for vertical movement, means for measuring the rotation of said indicator shaft, and means for mechanically interconnecting said sensing bar to said indicator shaft including a flexible wire disposed around said indicator shaft and extending from a point on said sensing bar below said indicator shaft to a point on said sensing bar above said indicator shaft, said wire including resilient tensioning means whereby vertical movement of said wire and said tensioning bar will rotate said indicator shaft, and bearing means on said sensing bar whereby said loading yoke my be mechanically connected to said sensing bar so as to exert a constant force upon a specimen.

JOHANNES A. VAN DEN AKKER.

REFERENCES CITED

The following references are of record in the file of this patent:

UNITED STATES PATENTS

| Number | Name | Date |
| --- | --- | --- |
| 1,062,032 | Rawstron | May 20, 1913 |
| 1,385,164 | Witham, Jr. | July 19, 1921 |
| 1,594,536 | Ludlow | Aug. 3, 1926 |
| 1,664,833 | Schaper | Apr. 3, 1928 |
| 1,763,400 | Lewis | June 10, 1930 |
| 1,908,412 | Domina | May 9, 1933 |
| 2,154,280 | Nadai et al. | Apr. 11, 1939 |
| 2,206,315 | Zimmerman | July 2 1940 |
| 2,375,034 | Semchyshen | May 1, 1945 |
| 2,404,584 | Liska et al. | July 23, 1946 |

FOREIGN PATENTS

| Number | Country | Date |
| --- | --- | --- |
| 686,420 | Germany | Jan. 9, 1940 |